(12) United States Patent
McPhillips (10) Patent No.: US 10,473,260 B2
(45) Date of Patent: Nov. 12, 2019

(54) DISPLAY SUPPORT SYSTEM

(71) Applicant: Atomic Design Inc., Lititz, PA (US)

(72) Inventor: Thomas McPhillips, Manheim, PA (US)

(73) Assignee: Atomic Design Inc., Lititz, PA (US)

( * ) Notice: Subject to any disclaimer, the term of this patent is extended or adjusted under 35 U.S.C. 154(b) by 51 days.

(21) Appl. No.: 15/624,238

(22) Filed: Jun. 15, 2017

(65) Prior Publication Data

US 2018/0058625 A1 Mar. 1, 2018

Related U.S. Application Data

(63) Continuation-in-part of application No. 29/575,622, filed on Aug. 26, 2016, now Pat. No. Des. 819,138.

(51) Int. Cl.
*F16M 11/24* (2006.01)
*A47B 47/00* (2006.01)
(Continued)

(52) U.S. Cl.
CPC ......... *F16M 11/24* (2013.01); *A47B 47/0016* (2013.01); *A47B 47/0091* (2013.01);
(Continued)

(58) Field of Classification Search
CPC .. F16M 11/24; A47B 47/0016; A47B 47/0091
(Continued)

(56) References Cited

U.S. PATENT DOCUMENTS

| 2,692,689 A | 10/1954 | Wynne, Sr. |
| 2,709,318 A * | 5/1955 | Benjamin ............. A63H 33/10 |
| | | 16/38 |

(Continued)

FOREIGN PATENT DOCUMENTS

| AU | 2012261483 A1 | 6/2013 |
| CA | 1263233 A1 | 11/1989 |

(Continued)

OTHER PUBLICATIONS

Installation Instructions for Pillow Wall, by Atomic, www.atomicrental.tv, (717-626-4408), dated Nov. 25, 2013, 1 page.

(Continued)

*Primary Examiner* — Anita M King
(74) *Attorney, Agent, or Firm* — Barley Snyder (57) ABSTRACT

A support connector is provided and includes a support body and a latch. The support body includes a latch receiving passageway extending from a first end thereof and into interior of the support body. The latch extends into the latch receiving passageway and is secured to the support body. The latch includes a latch body, a lever, a latch pin and an expanding element. The latch body includes a body base and a lever receiving space extending through a center thereof. The lever is secured in the lever receiving space and is rotatably connected to the latch body. The latch pin extends through the body base and is connected to the lever, while the expanding element is positioned between an end of the latch pin and the body base. The expanding element receives the latch pin.

15 Claims, 12 Drawing Sheets

(51) Int. Cl.
*G09F 9/00* (2006.01)
*F16M 11/04* (2006.01)
*F16M 11/22* (2006.01)

(52) U.S. Cl.
CPC ........... *F16M 11/041* (2013.01); *F16M 11/22* (2013.01); *G09F 9/00* (2013.01); *F16M 2200/02* (2013.01)

(58) Field of Classification Search
USPC ............ 248/220.21, 221.11, 222.11, 222.13, 248/205.5, 206.1
See application file for complete search history.

(56) References Cited

U.S. PATENT DOCUMENTS

| | | | |
|---|---|---|---|
| 2,970,396 | A | 2/1961 | Worrell |
| 3,192,820 | A | 7/1965 | Pitzer |
| 3,426,913 | A | 2/1969 | Abatiell, Jr. |
| 3,537,199 | A | 11/1970 | Lawson |
| 3,571,999 | A | 3/1971 | Downing |
| 3,593,474 | A | 7/1971 | Neels |
| 3,596,701 | A | 8/1971 | Cowan |
| 3,632,147 | A * | 1/1972 | Finger ................. A47F 5/14 403/171 |
| 3,936,111 | A | 2/1976 | Mazzucconi |
| 4,001,987 | A | 1/1977 | Coulthard |
| 4,043,531 | A * | 8/1977 | Green .................. A01K 97/10 248/205.8 |
| 4,114,160 | A | 9/1978 | Verini |
| 4,807,837 | A | 2/1989 | Gawlik et al. |
| 4,822,199 | A * | 4/1989 | Nehls ................... E04B 1/1906 403/171 |
| D307,448 | S | 4/1990 | Akard |
| 5,036,641 | A | 8/1991 | Viry |
| 5,061,018 | A | 10/1991 | Pederson et al. |
| 5,169,258 | A * | 12/1992 | Raynak ................. E04B 1/585 403/170 |
| 5,344,115 | A | 9/1994 | Mayne |
| 5,478,041 | A | 12/1995 | Mayne |
| 5,590,921 | A | 1/1997 | Holtman et al. |
| 5,671,852 | A | 9/1997 | Maharg |
| 5,722,477 | A | 3/1998 | Richter et al. |
| 5,947,356 | A | 9/1999 | Delong |
| 5,993,287 | A | 11/1999 | Melashenko et al. |
| 6,340,046 | B1 | 1/2002 | Basseches |
| 6,370,803 | B1 | 4/2002 | Burquest |
| 6,419,332 | B1 | 7/2002 | Caldwell, Jr. et al. |
| 6,702,640 | B1 | 3/2004 | Park |
| 6,718,709 | B2 | 4/2004 | Koutras et al. |
| 6,983,853 | B1 | 1/2006 | Fickett |
| D515,252 | S | 2/2006 | Dumbrell |
| D562,113 | S | 2/2008 | Ciungan et al. |
| D618,282 | S | 6/2010 | Kosir |
| D624,461 | S | 9/2010 | Noble et al. |
| 7,874,090 | B2 | 1/2011 | Flagg |
| D634,745 | S | 3/2011 | Park et al. |
| 8,069,632 | B2 | 12/2011 | Li |
| 8,083,189 | B2 | 12/2011 | Sun et al. |
| 8,162,268 | B1 | 4/2012 | Huang |
| D708,504 | S | 7/2014 | Kaplan |
| D709,203 | S | 7/2014 | Shikata |
| D736,858 | S | 8/2015 | McPhillips |
| 9,272,226 | B2 * | 3/2016 | Samlaska ............. A63H 23/005 |
| 2002/0036908 | A1 | 3/2002 | Pederson |
| 2002/0154789 | A1 | 10/2002 | Rodgers |
| 2003/0000904 | A1 | 1/2003 | Lung et al. |
| 2003/0192271 | A1 | 10/2003 | Koutras et al. |
| 2004/0035987 | A1 | 2/2004 | Oddsen, Jr. |
| 2004/0089782 | A1 | 5/2004 | Eliason et al. |
| 2005/0007031 | A1 | 1/2005 | Hyder |
| 2007/0107853 | A1 | 5/2007 | Hsieh |
| 2009/0134285 | A1 | 5/2009 | Huang |
| 2009/0196034 | A1 | 8/2009 | Gherardini et al. |
| 2012/0169999 | A1 | 7/2012 | Cavendish et al. |
| 2014/0047747 | A1 | 2/2014 | Jackson |
| 2014/0183309 | A1 | 7/2014 | Pasho |
| 2014/0197123 | A1 | 7/2014 | McPhillips |

FOREIGN PATENT DOCUMENTS

| | | |
|---|---|---|
| DE | 8517546.3 U1 | 1/1985 |
| DE | 29820223 U1 | 2/1999 |
| DE | 10138986 A | 3/2003 |
| DE | 102011015351 A1 | 10/2012 |
| EP | 1995508 A2 | 11/2008 |
| FR | 2851442 A1 | 2/2003 |

OTHER PUBLICATIONS

PCT Notification and International Preliminary Report on Patentability, Application No. PCT/US2014/011055, dated Jul. 14, 2015, 7 pages.
PCT Notification, International Search Report, International Application No. PCT/US2014/061074, dated Feb. 25, 2015, 12 pages.
PCT Notification, International Search Report and Written Opinion, International Application No. PCT/US2014/011055, dated Jun. 2, 2014, 10 pages.
PCT International Preliminary Report on Patentability, International Application No. PCT/US2014/061074, dated Apr. 19, 2016, 7 pages.
PCT Notification of Transmittal of International Preliminary Report on Patentability, International Application No. PCT/US2014/061074, dated Apr. 28, 2016, 1 page.
Attachment 1, Installation Instructions, Swell Latch Installation Instructions, Innovative Components, dated Jun. 16, 2009, 1 page.
Japanese Office Action and English translation of Japanese Office Action, dated Jul. 18, 2017, 8 pages.

* cited by examiner

DISPLAY SUPPORT SYSTEM

CROSS-REFERENCE TO RELATED APPLICATIONS

This application is a continuation-in-part of U.S. Design patent application Ser. No. 29/575,622, filed on Aug. 26, 2016.

FIELD OF THE INVENTION

The invention relates to a display support system and, more particularly, to a portable and modular display support system.

BACKGROUND

Decorative modular displays are commonly used in stage and set design. Generally, modular units are hung from a hanging support system using backdrop technology. A known modular display system uses a truss or theatre fly-system pipes to hang modular panels that clip together using rings or hooks to form a backdrop, which results in a decorative surface that is aesthetic while also increasing the range of available lighting effects. The backdrop is sized to fit the space required. In some circumstances, a floor support system may be used instead of a truss and/or backdrop. In the known floor support system, a temporary structure is set up from the floor, rather than suspended from the ceiling. The known floor support system includes metal pipes or tubes that connect to each other and the modular units hang from these metal pipes or tubes.

When using pipes in the known floor support system, connecting pipes are commonly over tightened and damaged. Furthermore, known support systems include complex or permanent attachment mechanisms used to connect one modular unit to an adjacent modular unit. Such attachment restricts replacement of each modular unit and limits the flexibility of the entire display system. These known designs are expensive and require tedious, time-consuming labor in both assembly and dis-assembly. It has long been desired to have a modular display support system that can be quickly constructed and deconstructed without sacrificing the structural integrity of the system.

SUMMARY

A support connector is provided and includes a support body and a latch. The support body includes a latch receiving passageway extending from a first end thereof and into interior of the support body. The latch extends into the latch receiving passageway and is secured to the support body. The latch includes a latch body, a lever, a latch pin and an expanding element. The latch body includes a body base and a lever receiving space extending through a center thereof. The lever is secured in the lever receiving space and is rotatably connected to the latch body. The latch pin extends through the body base and is connected to the lever, while the expanding element is positioned between an end of the latch pin and the body base. The expanding element receives the latch pin.

BRIEF DESCRIPTION OF THE DRAWINGS

The invention will be explained in greater detail in the following with reference to embodiments, referring to the appended drawings, in which.

DETAILED DESCRIPTION OF THE EMBODIMENTS

The invention is explained in greater detail below with reference to embodiments of a display support system. The invention, may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
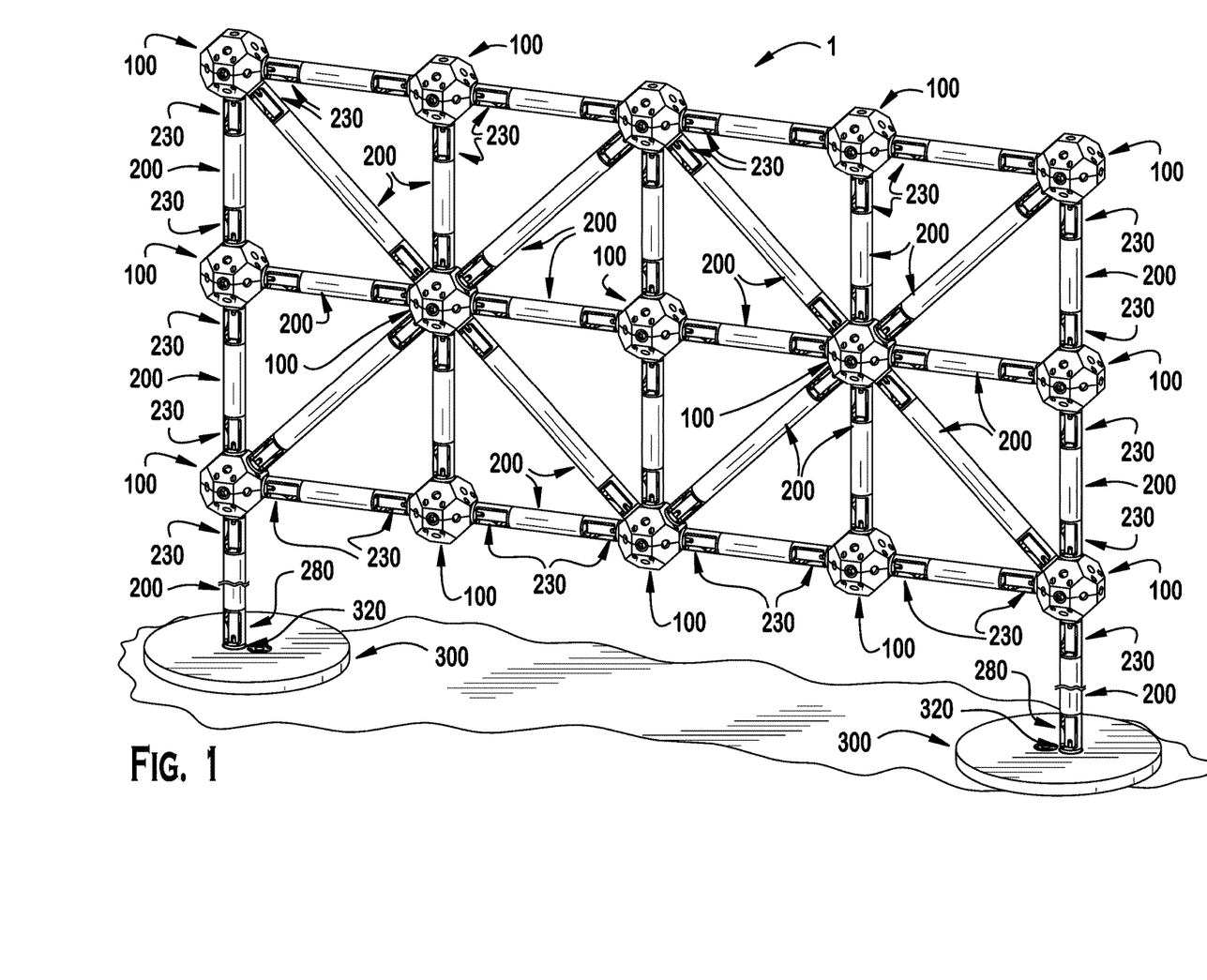
FIG. 1 is a perspective view of a display support system according to the invention.

A display support system 1 according to an embodiment of the invention is shown generally in FIG. 1. The display support system 1 includes a plurality of node connectors 100, a plurality of support connectors 200, and a plurality of bases 300. The major components of the invention will now be described in greater detail.

Figure 2:
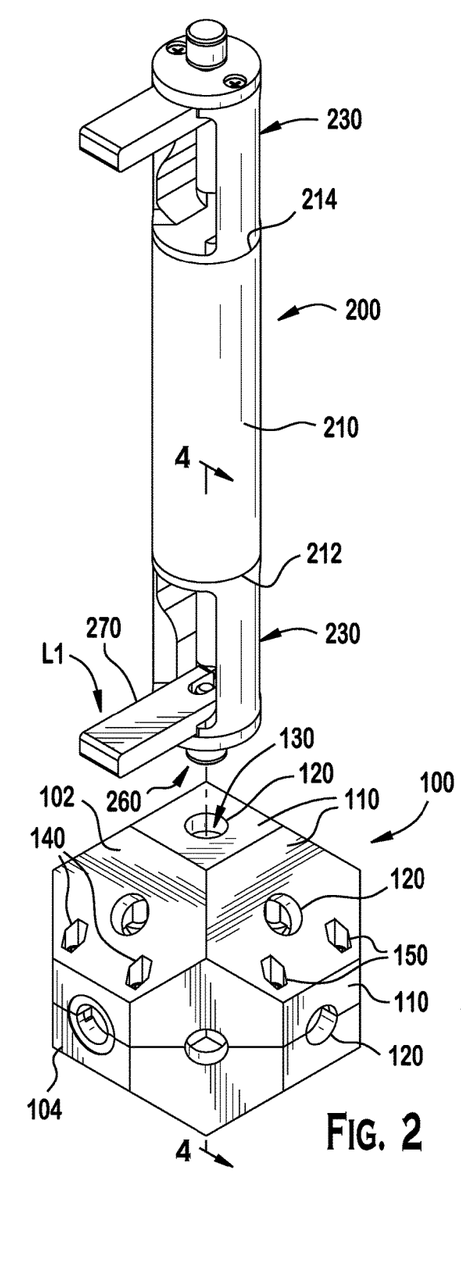
FIG. 2 is a perspective view of a node connector and a support connector of the display support system according to the invention.

A node connector 100 of the plurality of node connectors 100 is shown in detail in FIG. 2. The node connector 100 is a multi-sided three-dimensional shape, and in the shown embodiment, the node connector 100 is an octadecahedron. The node connector 100 has a plurality of planar surfaces 110 which intersect with one another to form an exterior shape of the node connector 100 and define a node interior space 130. In the shown embodiment, the planar surfaces 110 intersect one another at the same angle, which may be one of a range of angles depending on the shape of the node connector 100 and number of planar surfaces 110. The node connector 100, depending on the three-dimensional shape, may have more than six intersecting planar surfaces 110, and in the shown embodiment, has eighteen intersecting planar surfaces 110.

The node connector 100, as shown in FIG. 2, has a plurality of latch receiving passageways 120. Each of the plurality of latch receiving passageways 120 is disposed on one of the plurality of planar surfaces 110 and extends through the planar surface 110. As shown in FIG. 2, each latch receiving passageway 120 is positioned approximately centrally on the respective planar surface 110.

In the embodiment of the node connector 100 shown in FIG. 2, the node connector 100 is formed by assembling a first half 102 and a second half 104. Each of the first half 102 and the second half 104 are identically formed. As shown in FIG. 2, for a first subset of the plurality of planar surfaces 110, each of the first half 102 and the second half 104 form half of the planar surfaces 110 of the first subset of planar surfaces 110 including half of the latch receiving passageway 120. When joined, the first half 102 and the second half 104 fully form the planar surfaces 110 of the first subset of planar surfaces 110 and enclose the latch receiving passageways 120 on the first subset of planar surfaces 110.

Each of the first half 102 and the second half 104, as shown in FIG. 2, has a plurality of node fastener receiving passageways 140 disposed on a second subset of the plurality planar surfaces 110. A plurality of node fasteners 150 are disposed in the plurality of node fastener receiving passageways 140 to attach the first half 102 to the second half 104. The plurality of node fasteners 150 may be screws, bolts, or any other form of fastener known to those with ordinary skill in the art.

In an alternative embodiment, the node connector 100 may be formed monolithically without being split into halves 102, 104, omitting the plurality of node fastener receiving passageways 140 and the plurality of node fasteners 150.

Figure 3:
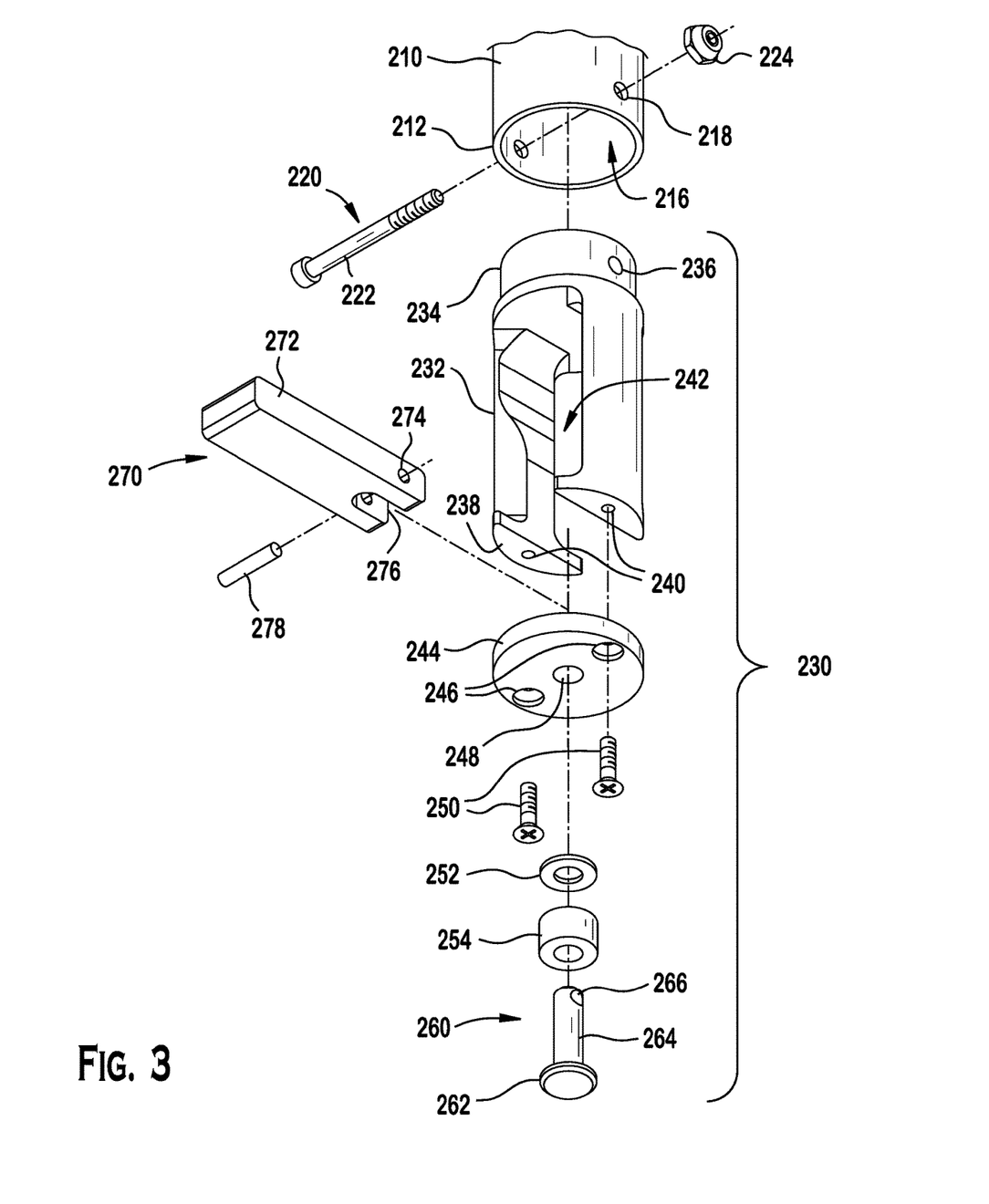
FIG. 3 is an exploded perspective view of a first latch section of the support connector of FIG. 2.

A support connector 200 of the plurality of support connectors 200 is shown in detail in FIGS. 2 and 3. The support connector 200 includes a support body 210 and a plurality of first latch sections 230.

The support body 210, as shown in FIGS. 2 and 3, is an elongated cylindrical member having a first end 212 and an opposite second end 214. The support body 210 defines a latch section receiving passageway 216 extending from the first end 212 to the second end 214 in an interior of the support body 210. The support body 210 has a plurality of latch section fastener receiving passageways 218 disposed on each of the first end 212 and the second end 214. In the shown embodiment, the support body 210 is formed of a durable, lightweight metal material such as aluminum. In other embodiments, the support body 210 may be formed of plastic materials.

A first latch section 230 of the plurality of first latch sections 230 is shown in FIGS. 2 and 3. The first latch section 230 has a latch body 232, a first latch base 244, a expanding element 254, a latch pin 260, and a lever 270.

The latch body 232, as shown in FIG. 3, is a monolithic structure having a protrusion 234 disposed on a first end and a latch surface 238 disposed on an opposite second end. In the shown embodiment, the latch body 232 is approximately cylindrical. The protrusion 234 is formed to have a narrower width than a central portion of the latch body 232 disposed between the protrusion 234 and the latch surface 238. The latch surface 238 faces a longitudinal direction of the latch body 232. A latch section fastener receiving passageway 236 is disposed on the protrusion 234 and a plurality of latch fastener receiving passageways 240 are disposed extending into the latch surface 238. The central portion of the latch body 232 defines a lever receiving space 242. In the shown embodiment, the lever receiving space 242 has a curved shape on an interior of the latch body 232, but one with ordinary skill in the art would understand that the lever receiving space 242 may have a variety of shapes in-keeping with the embodiments disclosed herein. In the shown embodiment, the latch body 232 is formed of a durable, lightweight metal material such as aluminum. In other embodiments, the latch body 232 may be formed of plastic materials.

The first latch base 244, as shown in FIG. 3, is a disc-shaped member. The first latch base 244 has a latch pin receiving passageway 248 disposed approximately centrally on the first latch base 244 and a pair of latch fastener receiving passageways 246; each latch fastener receiving passageway 246 is disposed adjacent the latch pin receiving passageway 248 on one side of the latch pin receiving passageway 248. In the shown embodiment, the first latch base 244 is formed of a durable, lightweight metal material such as aluminum. In other embodiments, the first latch base 244 may be formed of plastic materials.

The expanding element 254, as shown in FIG. 3, is a hollow cylindrical member formed of an elastically deformable material such as rubber (i.e. swell washer). In the shown embodiment, the first latch section 230 also has a static washer 252 formed of a non-deformable material such as a metal or a plastic.

The latch pin 260, as shown in FIG. 3, comprises an elongated cylindrical shaft 264 having a flange 262 disposed on a first end and a hinge rod receiving passageway 266 extending through an opposite second end of the shaft 264. The latch pin 260 may be formed of a durable material such as a metal or a plastic.

The lever 270, as shown in FIG. 3, includes a lever body 272 and a hinge rod 278. The lever body 272 is an elongated rectangular member having a plurality of hinge rod receiving passageways 274 extending through an end of the lever body 272. The lever body 272 defines a latch pin receiving space 276 at the end between the hinge rod receiving passageways 274. In the shown embodiment, the lever body 272 is formed of a durable, lightweight metal material such as aluminum. In other embodiments, the lever body 272 may be formed of plastic materials.

The hinge rod 278 is an elongated cylindrical member. The hinge rod 278 is disposed in the hinge rod receiving passageways 274, extending through the latch pin receiving space 276. The hinge rod 278 is sized such that, when the hinge rod 278 is disposed in the hinge rod receiving passageways 274 and the latch pin receiving space 276, the hinge rod 278 does not protrude from either side of the lever body 272.

Assembly of the support connector 200 will now be described in greater detail with reference to FIGS. 2-4.

A plurality of latch fasteners 250, shown in FIG. 3, attach the first latch base 244 to the latch body 232. In the shown embodiment, the plurality of latch fasteners 250 are positioned to extend through the latch fastener receiving passageways 246 of the first latch base 244 and engage with the latch fastener receiving passageways 240 of the latch surface 238. The latch fasteners 250 attach the first latch base 244 to the latch body 232 such that the first latch base 244 abuts the latch surface 238. The first latch base 244 has a same width as the latch body 232, and consequently, an outer surface of the first latch base 244 is aligned with an outer surface of the latch body 232 when attached, as shown in FIG. 2. In the shown embodiment, each of the plurality of latch fasteners 250 is a screw, however, one with ordinary skill in the art would understand that the plurality of latch fasteners 250 may be other fasteners such as a latch, nut and bolt, hook and loop fastener, or removable adhesive.

The lever 270 is pivotably secured to the latch pin 260 within the latch body 232 to complete assembly of the first latch section 230. As shown in FIGS. 2-4, the expanding element 254 is disposed around the shaft 264 of the latch pin 260 and abuts the flange 262. The static washer 252 is disposed around the shaft 264 adjacent the expanding element 254. The latch pin 260 is inserted into the latch pin receiving passageway 248 of the first latch base 244, as shown in FIG. 4, such that the hinge rod receiving passageway 266 is disposed in the lever receiving space 242 of the latch body 232 and the static washer 252 and expanding element 254 are disposed on an opposite side of the first latch base 244. The static washer 252 abuts a side of the first latch base 244.

Figure 4:
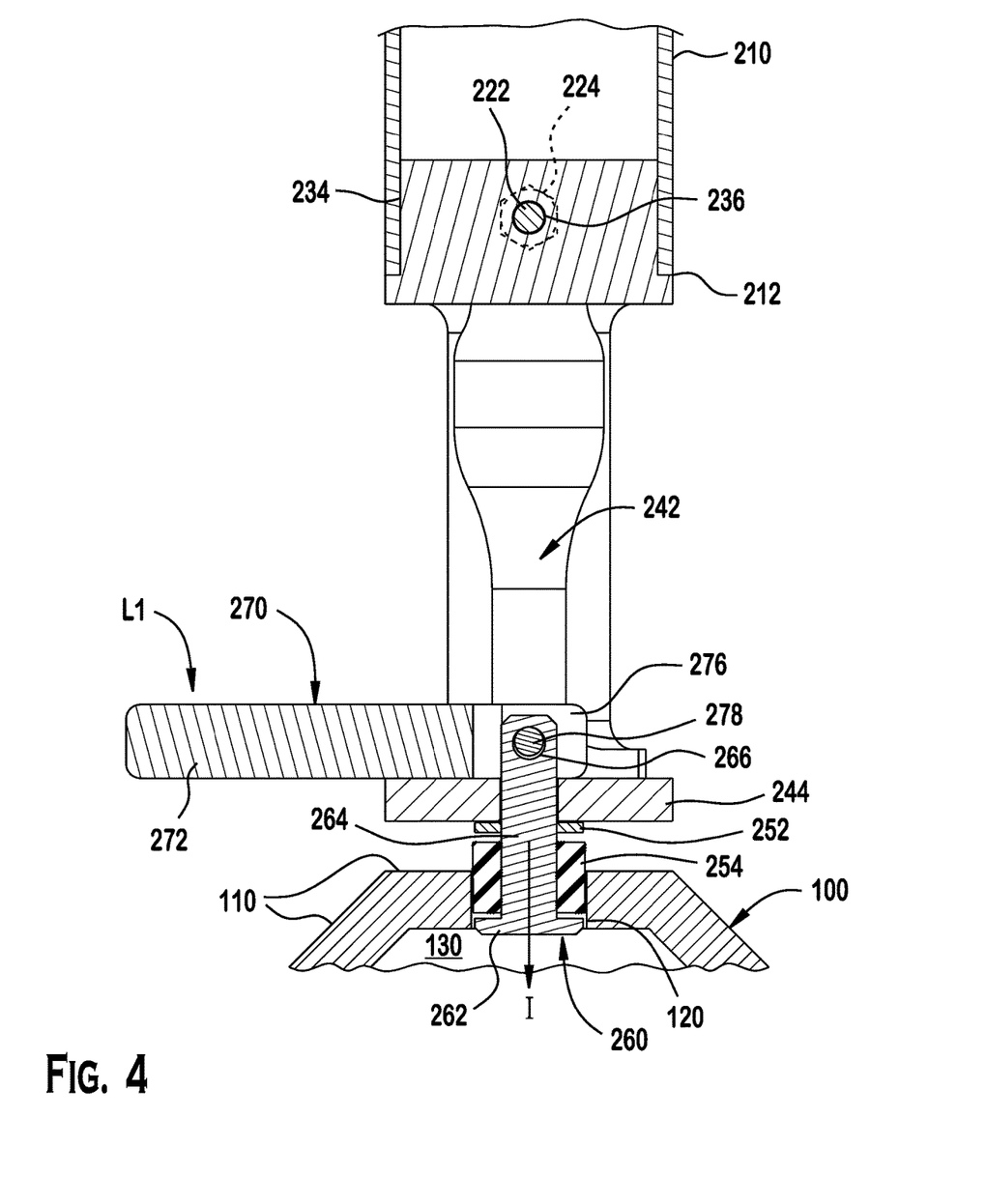
FIG. 4 is a sectional view of the first latch section and the node connector with a latch of first latch section in an unlocked position, taken along line 4-4 of FIG. 2.

As shown in FIGS. 2-4, the second end of the shaft 264 of the latch pin 260 having the hinge rod receiving passageway 266 is disposed in the latch pin receiving space 276 of the lever body 272. The hinge rod 278 is positioned through the hinge rod receiving passageways 274 of the lever body 272 and the hinge rod receiving passageway 266 of the latch pin 260 and pivotably attaches the lever body 272 to the latch pin 260 within the lever receiving space 242.

The first latch section 230 is attached to the support body 210 by the latch section fastener 220, as shown in FIG. 3. In the shown embodiment, the latch section fastener 220 has a threaded bolt 222 and a nut 224. One with ordinary skill in the art would understand that the latch section fastener 220 may be other fasteners such as an epoxy, latch, screw, hook and loop fastener, or removable adhesive.

As shown in FIG. 3, the protrusion 234 of the latch body 232 is positioned within the latch section receiving passageway 216 at the first end 212 of the support body 210. The latch section fastener receiving passageway 236 of the protrusion 234 is aligned with the latch section fastener receiving passageways 218 at the first end 212 of the support body 210. The bolt 222 is inserted through the latch section fastener receiving passageway 236 of the protrusion 234 and the latch section fastener receiving passageways 218 at the first end 212 of the support body 210, and the bolt 222 is attached to the nut 224 to fasten the first latch section 230 to the first end 212 of the support body 210. When attached, as shown in FIG. 2, an outer surface of the support body 210 is aligned with an outer surface of the latch body 232. In an embodiment in which the fastener 220 is an epoxy, the protrusion 234 does not have the latch fastener receiving passageway 236 and the support body 210 does not have the latch section fastener receiving passageways 218; the epoxy is disposed between the protrusion 234 and the first end 212 of the support body 210.

The attachment of the first latch section 230 to the first end 212 of the support body 210 has been described herein, and another first latch section 230 can similarly be attached to the second end 214 of the support body 210, as shown in FIG. 2, using the same fasteners 220 and arrangement of parts.

Releasable attachment of the support connectors 200 to the node connectors 100 to form a modular structure will now be described in greater detail with reference to FIGS. 2 and 4-6.

Figure 5:
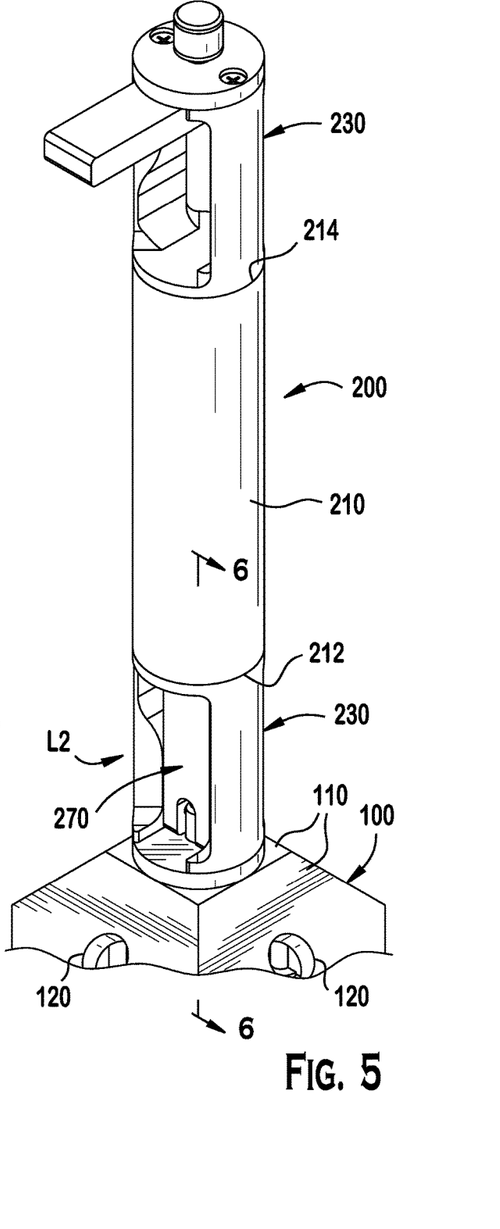
FIG. 5 is a perspective view of the first latch section and the node connector with the latch of the first latch section in a locked position.
Figure 6:
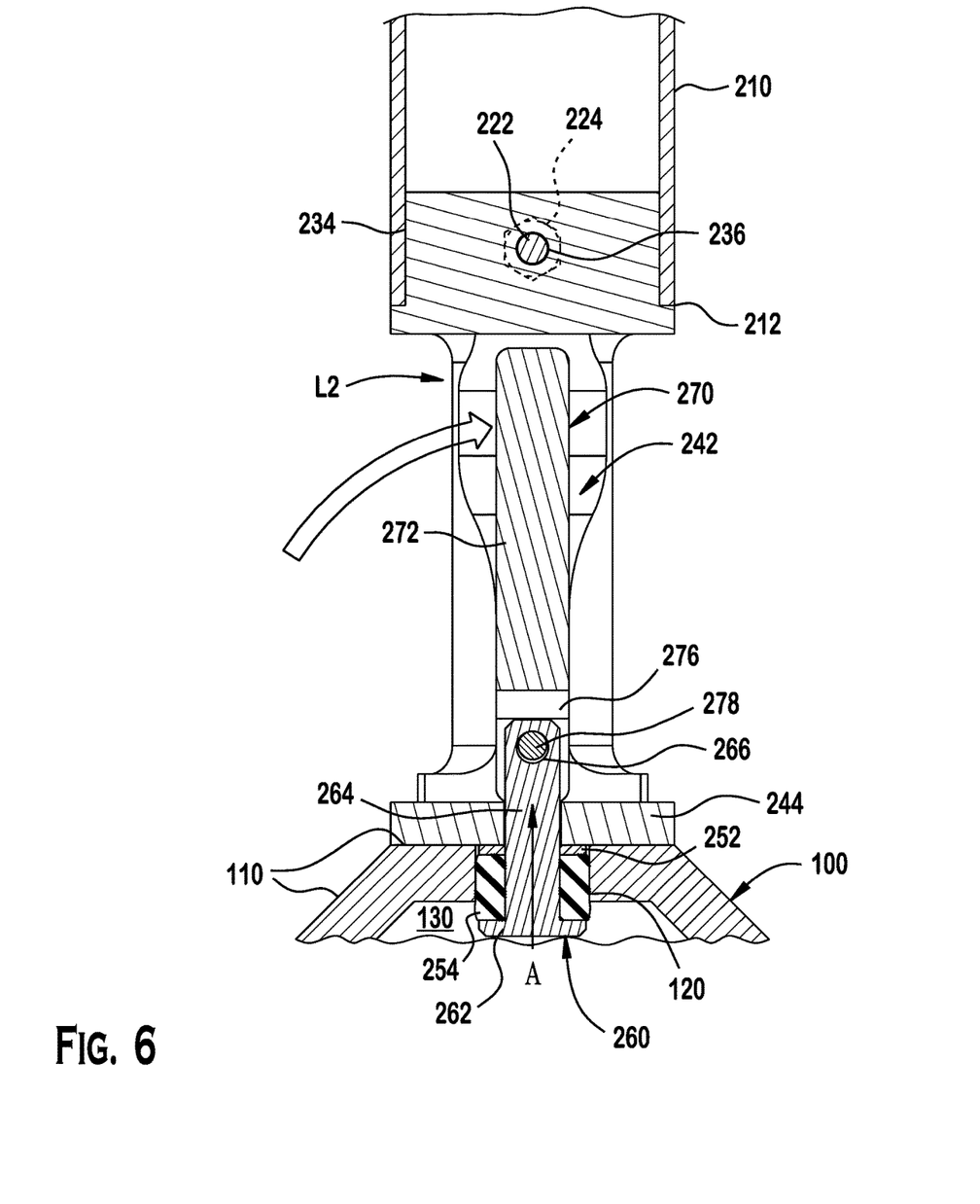
FIG. 6 is a sectional view of the first latch section and the node connector with the latch of the first latch section in the locked position, taken along line 6-6 of FIG. 5.

The lever 270 is pivotably secured to the latch pin 260 and is movable between an unlocked position L1, shown in FIGS. 2 and 4, and a locked position L2, shown in FIGS. 5 and 6. As shown in FIGS. 2 and 4, with the lever 270 in the unlocked position L1, the latch pin 260 surrounded by the expanding element 254 is inserted into a latch receiving passageway 120 of a node connector 100 in an insertion direction I. The first latch section 230 is inserted into the latch receiving passageway 120 until the first latch base 244 abuts the respective planar surface 110 of the fastener receiving passageway 120, the flange 262 and a first portion of the expanding element 254 are disposed in the node interior space 130, and the static washer 252 and a second portion of the expanding element 254 are disposed in the latch receiving passageway 120, as shown in FIGS. 5 and 6.

To secure the support connector 200 to the node connector 100, the lever 270 is rotated from the unlocked position L1 to the locked position L2 with the latch pin 260 and expanding element 254 remaining in the fully inserted position. As shown in FIGS. 4 and 6, during motion of the lever 270 from the unlocked position L1 to the locked position L2, the lever body 272 pivots while bearing against a surface of the first latch base 244. The motion of the lever body 272 moves the latch pin 260 in a direction A towards the first latch base 244, and in the locked position L2 as shown in FIG. 6, the flange 262 of the latch pin 260 is securely held closer to the first latch base 244 than in the unlocked position L1. In the locked position L2, the lever body 272 is positioned within the lever receiving space 242.

Moving the latch pin 260 closer to the first latch base 244 between the unlocked position L1 and the locked position L2 of the lever 270 compresses the elastic expanding element 254. The expanding element 254 expands under the compressive force as shown in FIG. 6 and forms an interference fit with the latch receiving passageway 120. In the locked position L2, the first latch section 230 of the support connector 200 is secured to the node connector 100 by the expanded expanding element 254. Attachment of the first latch section 230 to the node connector 100 with the lever 270 in the locked position L2 is shown in FIG. 5.

To release the attachment of the first latch section 230 to the node connector 100, the lever 270 is moved from the locked position L2 back to the unlocked position L1. The expanding element 254 elastically returns to the un-compressed position and is no longer interference-fit with the latch receiving passageway 120, as shown in FIG. 4. The first latch section 230 can then be removed from the node connector 100. The first latch section 230 permits the support connector 200 to be securely attached to the node connector 100 in a releasable manner.

Figure 14:
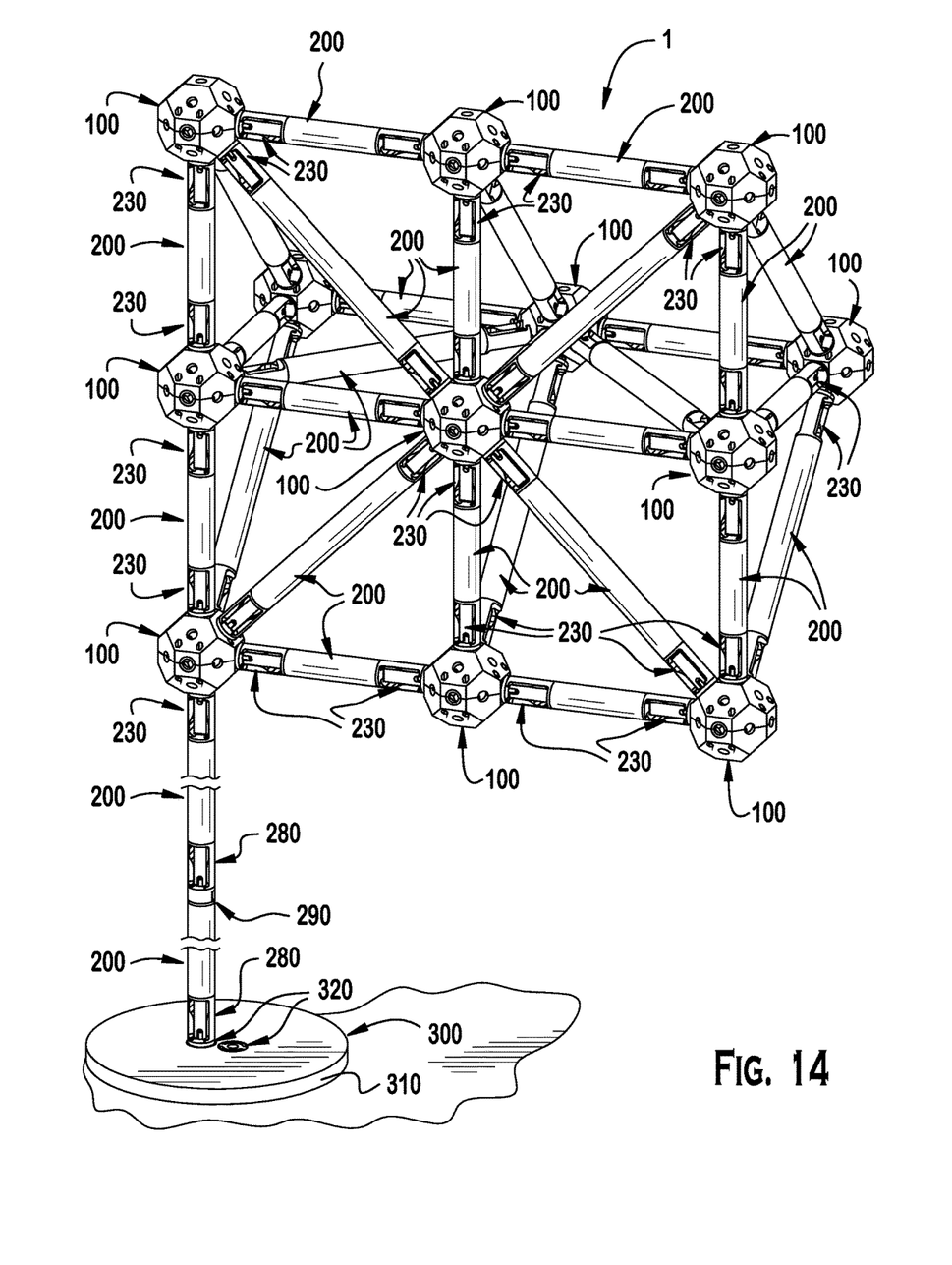
FIG. 14 is a perspective view of another display support system according to the invention.

The releasable attachment of one first latch section 230 at the first end 212 of the support connector 200 to one latch receiving passageway 120 of one node connector 100 has been described above. The first latch section 230 on the second end 214 of the support connector 200, shown in FIGS. 4 and 5, can similarly be attached to one latch receiving passageway 120 of another node connector 100. Furthermore, as shown in FIGS. 1 and 14, a plurality of support connectors 200 having a first latch section 230 on each end of the support connector 200 can be attached to a plurality of node connectors 100 to form a variety of modular support structures; one support connector 200 or a plurality of support connectors 200 can be attached to each node connector 100 at the latch receiving passageway 120 on any of the planar surfaces 110 to form the desired support structure.

The support structure formed by the modular and releasable attachment of the node connectors 100 and the support connectors 200 is supported by the plurality of bases 300 as shown in FIG. 1 to form the display support system 1.

Figure 7:
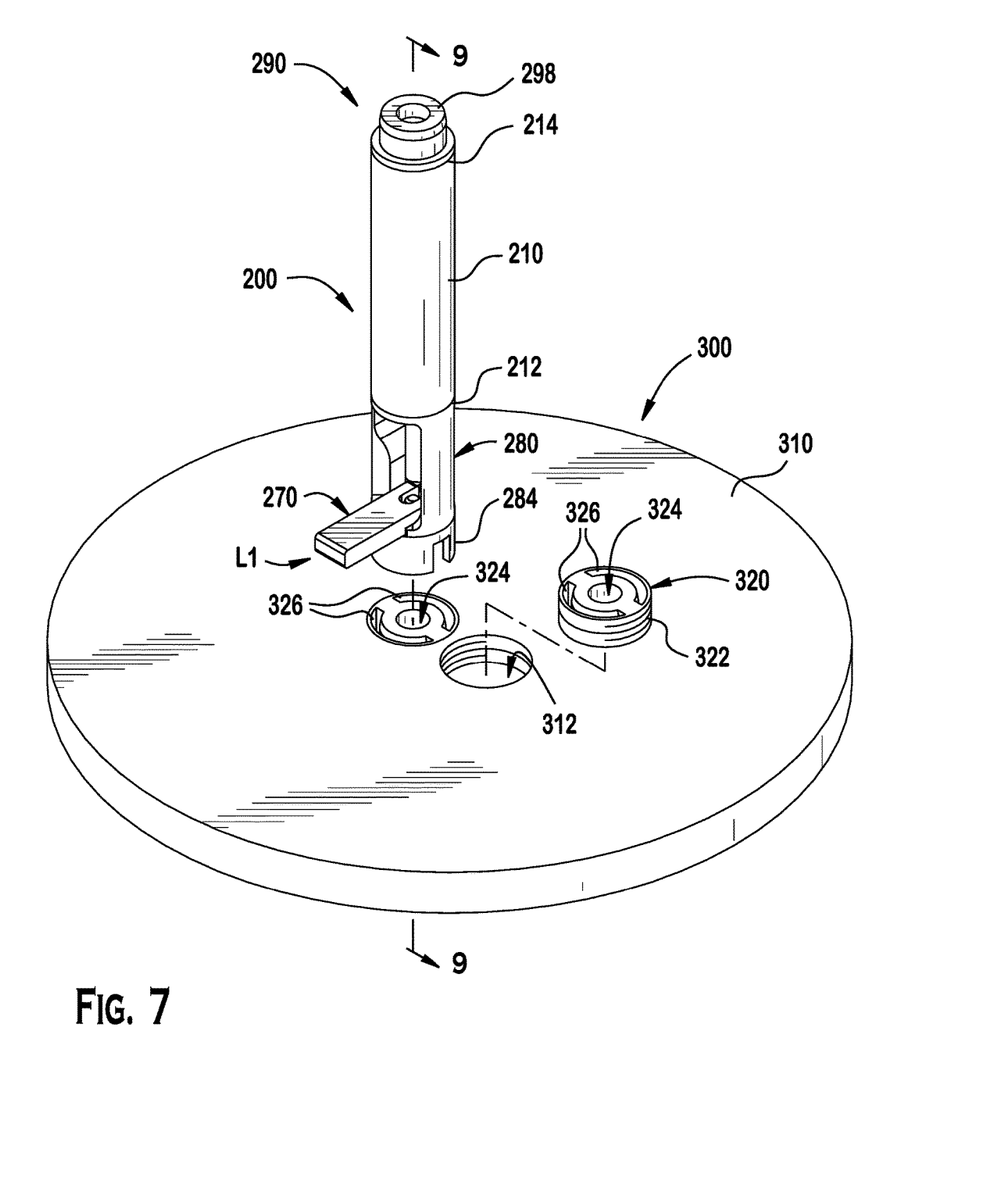
FIG. 7 is a perspective view of another support connector and a base of the display support system.

A base 300 of the plurality of bases 300, as shown in FIG. 7, includes a base body 310 and a base key 320. In the embodiment shown in FIG. 7, the base body 310 is a disc-shaped member. One with ordinary skill in the art would understand that the base body 310 may have a variety of shapes capable of supporting the node connectors 100 and support connectors 200. The base body 310 includes at least one base key receiving passageway 312 extending through the base body 310. In the shown embodiment, the base key receiving passageway 312 is threaded.

The base key 320, as shown in FIG. 7, is a disc-shaped member including outer threads 322, a expanding element receiving passageway 324 positioned centrally on the base key 320, and a plurality of second latch base receiving passageways 326. One of the second latch base receiving passageways 326 is disposed on each side of the expanding element receiving passageway 324. The base key 320, as shown in FIG. 7, is removably disposed in the base key receiving passageway 312 with the outer threads 322 engaging the threads of the base key receiving passageway 312.

The attachment of the support connector 200 to the base 300 and the attachment of support connectors 200 to one another to form the display support system 1 will now be described in greater detail with reference to FIGS. 7-13.

Figure 8:
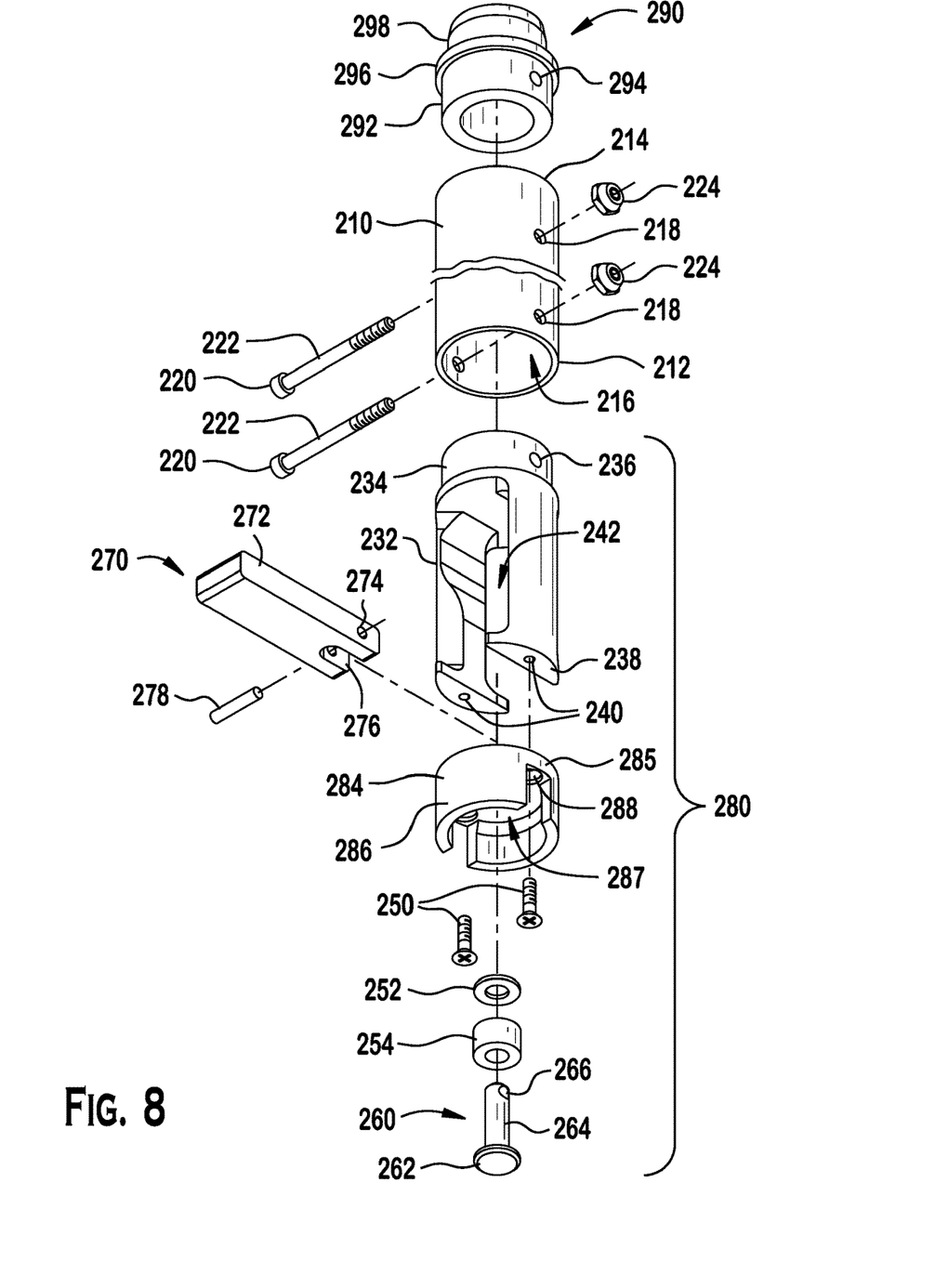
FIG. 8 is an exploded perspective view of a second latch section and a third latch section of the support connector of FIG. 7.

The support body 210 of the support connector 200 is capable of accepting a second latch section 280 or a third latch section 290 in place of the first latch section 230 at either the first end 212 or the second end 214, as shown in FIGS. 7 and 8.

The second latch section 280 is similar to the first latch section 230 shown in FIGS. 1-6, and like reference numbers indicate like elements. Only the differences of the second latch section 280 with respect to the first latch section 230 will be described in detail herein.

The second latch section 280, as shown in FIG. 8, has a second latch base 284 in place of the first latch base 244 of the first latch section 230. The second latch base 284 has a disc-shaped portion 285 at a first end and has second support members 286 extending from outer edges of the disc-shaped portion 285 to an opposite second end. In an embodiment, the second support members 286 extend 0.5" to 1" from the disc-shaped portion 285, and in the shown embodiment, the second support members 286 extend 0.75" from the disc-shaped portion 285. The second latch base 284 has a latch pin receiving passageway 287 disposed approximately centrally on the disc-shaped portion 285 and a pair of latch fastener receiving passageways 288; each latch fastener receiving passageway 288 is disposed adjacent to the latch pin receiving passageway 287 on one side of the latch pin receiving passageway 287. In the shown embodiment, the second latch base 284 is formed of a durable, lightweight metal material such as aluminum. In other embodiments, the second latch base 284 may be formed of plastic materials.

The plurality of latch fasteners 250, shown in FIG. 8, attach the second latch base 284 to the latch body 232. In the shown embodiment, the plurality of latch fasteners 250 are positioned to extend through the latch fastener receiving passageways 288 of the second latch base 284 and engage with the latch fastener receiving passageways 240 of the latch surface 238. The latch fasteners 250 attach the second latch base 284 to the latch body 232 such that the disc-shaped portion 285 abuts the latch surface 238. The second latch base 284 has a same width as the latch body 232, and consequently, an outer surface of the second latch base 284 is aligned with an outer surface of the latch body 232 when attached, as shown in FIG. 7.

Figure 9:
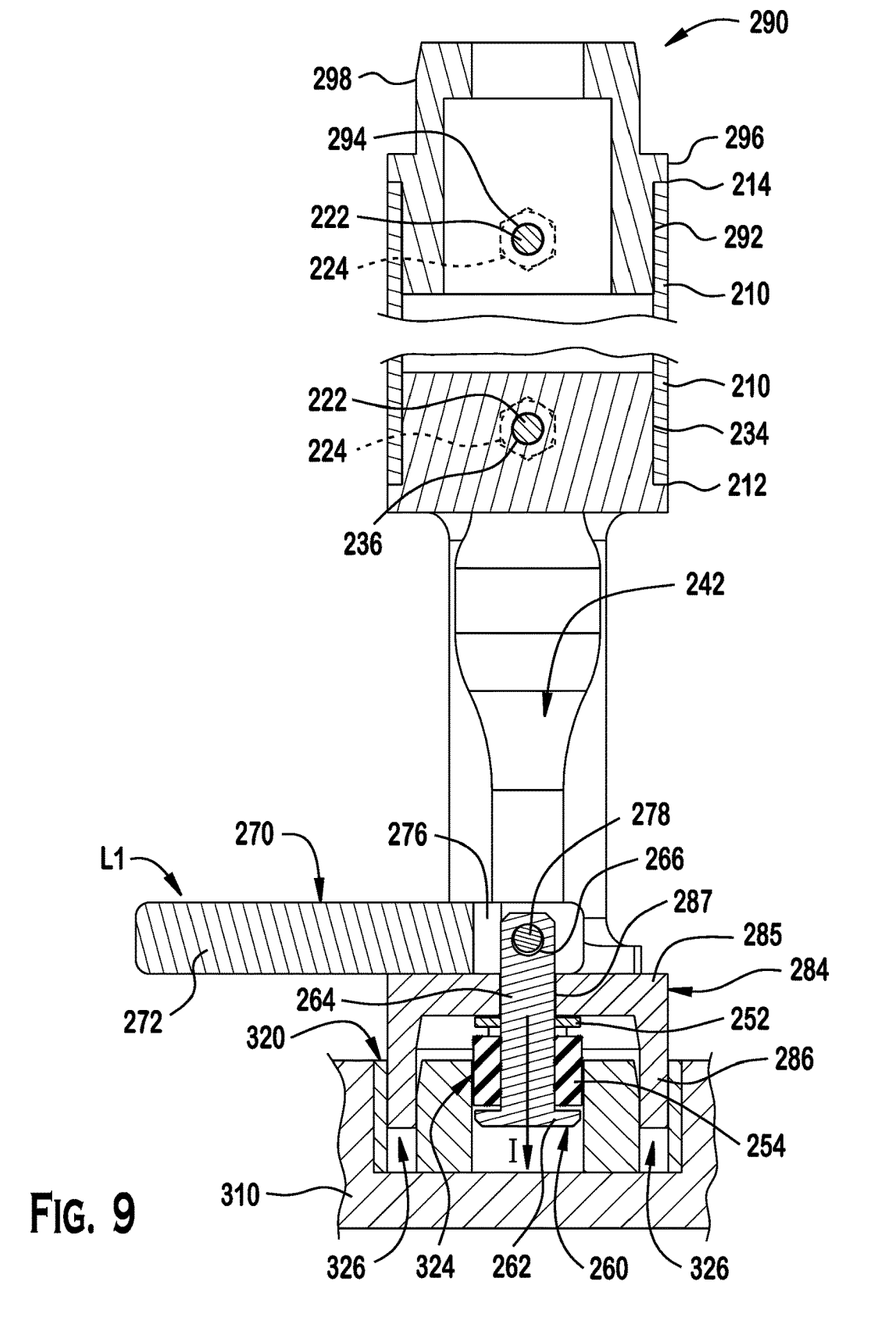
FIG. 9 is a sectional view of the second latch section and a base key of the base with a latch of the second latch section in an unlocked position, taken along line 9-9 of FIG. 7.

The latch pin 260, similarly to the first latch section 230, is inserted into the latch pin receiving passageway 287 of the second latch base 284, as shown in FIG. 9, such that the hinge rod receiving passageway 266 is disposed in the lever receiving space 242 of the latch body 232 and the static washer 252 and expanding element 254 are disposed on an opposite side of the disc-shaped portion 285 of the second latch base 284. The static washer 252 abuts a side of the disc-shaped portion 285.

The second latch section 280 is attached to the support body 210 by the latch section fastener 220, as shown in FIG. 8, which extends through the latch section fastener receiving passageway 236 of the protrusion 234 and the latch section fastener receiving passageways 218 at the first end 212 of the support body 210. The attachment of the second latch section 280 to the first end 212 of the support body 210 has been described herein, and another second latch section 280 can similarly be attached to the second end 214 of the support body 210 using the same fasteners 220 and arrangement of parts.

The third latch section 290 is shown in FIGS. 7 and 8. The third latch section 290, as shown in FIG. 8, has a hollow cylindrical protrusion 292 at a first end and a hollow cylindrical third support member 298 disposed at an opposite second end. A flange 296 is disposed between the protrusion 292 and the third support member 298. In an embodiment, the third support member 298 extends 0.5" to 1" from the flange 296, and in the shown embodiment, the third support member 298 extends 0.75" from the flange 296. A latch section fastener receiving passageway 294 extends through the protrusion 292.

The third latch section 290 is attached to the support body 210 by the latch section fastener 220, as shown in FIG. 8, which extends through the latch section fastener receiving passageway 294 of the protrusion 292 and the latch section fastener receiving passageways 218 at the second end 214 of the support body 210. The flange 296 abuts the second end 214 of the support body 210 and the third support member 298 extends from the second end 214 when the third latch section 290 is fully attached to the support body 210, as shown in FIG. 7. In an embodiment in which the fastener 220 is an epoxy, the protrusion 292 does not have the latch fastener receiving passageway 294 and the support body 210 does not have the latch section fastener receiving passageways 218; the epoxy is disposed between the protrusion 294 and the second end 214 of the support body 210. The attachment of the third latch section 290 to the second end 214 of the support body 210 has been described herein, and another third latch section 290 can similarly be attached to the first end 212 of the support body 210 using the same fasteners 220 and arrangement of parts.

Releasable attachment of the support connectors 200 to the base 300 via the second latch section 280 will now be described in greater detail with reference to FIGS. 7 and 9-11.

Figure 11:
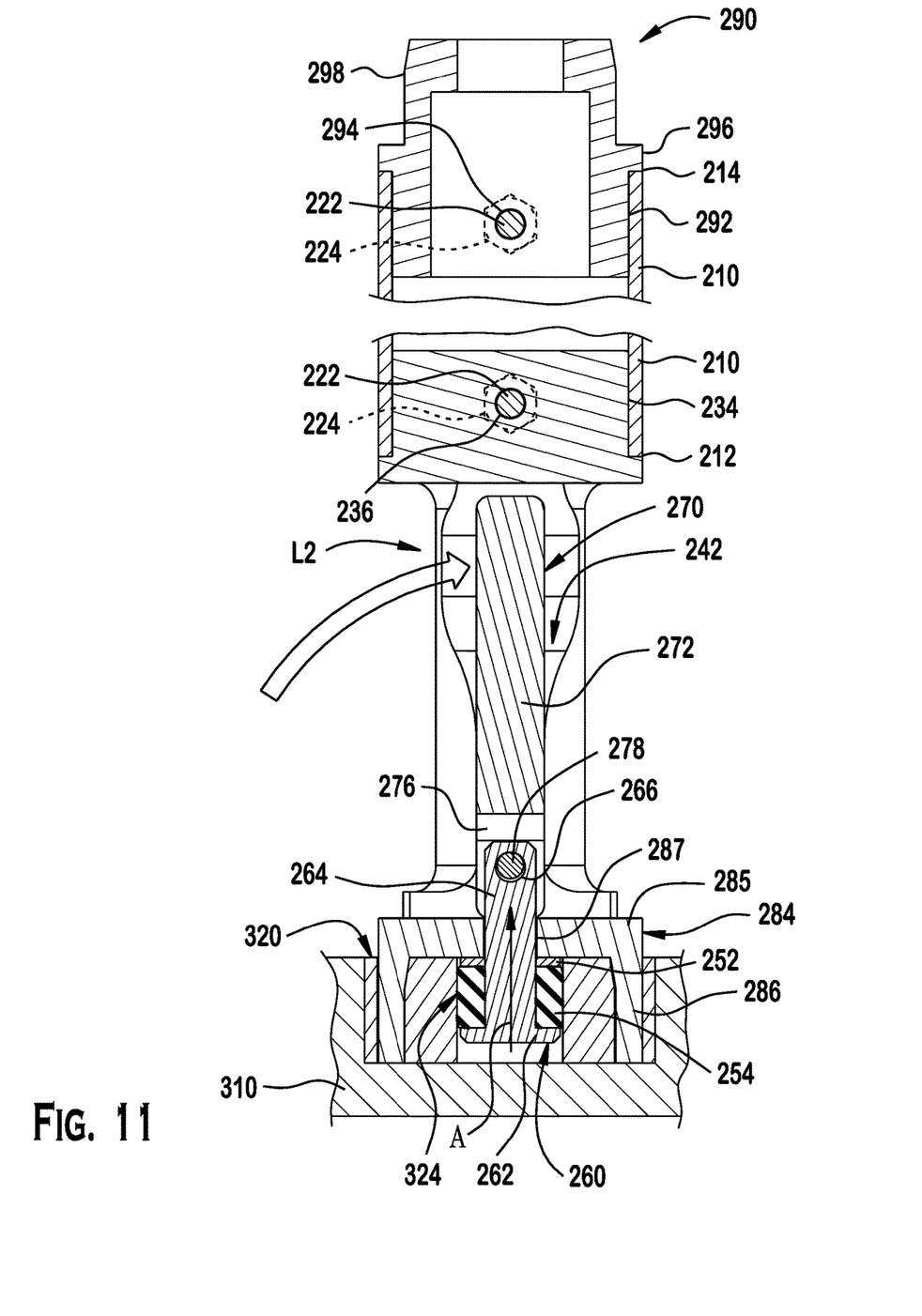
FIG. 11 is a sectional view of the second latch section and the base with the latch of the second latch section in the locked position, taken along line 11-11 of FIG. 10.

As shown in FIGS. 7 and 9, with the lever 270 in the unlocked position L1, the latch pin 260 surrounded by the expanding element 254 is inserted into the expanding element receiving passageway 324 of the base key 320 and the second support members 286 are inserted into the second latch base receiving passageways 326 of the base key 320 in an insertion direction I. The second latch base 284 and the latch pin 260 have a shape complementary to that of the base key 320. The second latch section 280 is inserted into the base key 320 until the disc-shaped portion 285 abuts a top surface of the base key 320, the flange 262, the expanding element 254, and the static washer 252 are disposed in the expanding element receiving passageway 324, and the second support members 286 abut a bottom of the second latch base receiving passageways 326, as shown in FIG. 11.

To secure the support connector 200 to the base 300, the lever 270 is rotated from the unlocked position L1 to the locked position L2 with the latch pin 260 and expanding element 254 remaining in the fully inserted position. As shown in FIGS. 9 and 11, during motion of the lever 270 from the unlocked position L1 to the locked position L2, the lever body 272 pivots while bearing against a surface of the second latch base 284. The motion of the lever body 272 moves the latch pin 260 in the direction A towards the second latch base 284, and in the locked position L2 as shown in FIG. 11, the flange 262 of the latch pin 260 is securely held closer to the second latch base 284 than in the unlocked position L1. In the locked position L2, the lever body 272 is positioned within the lever receiving space 242.

Figure 10:
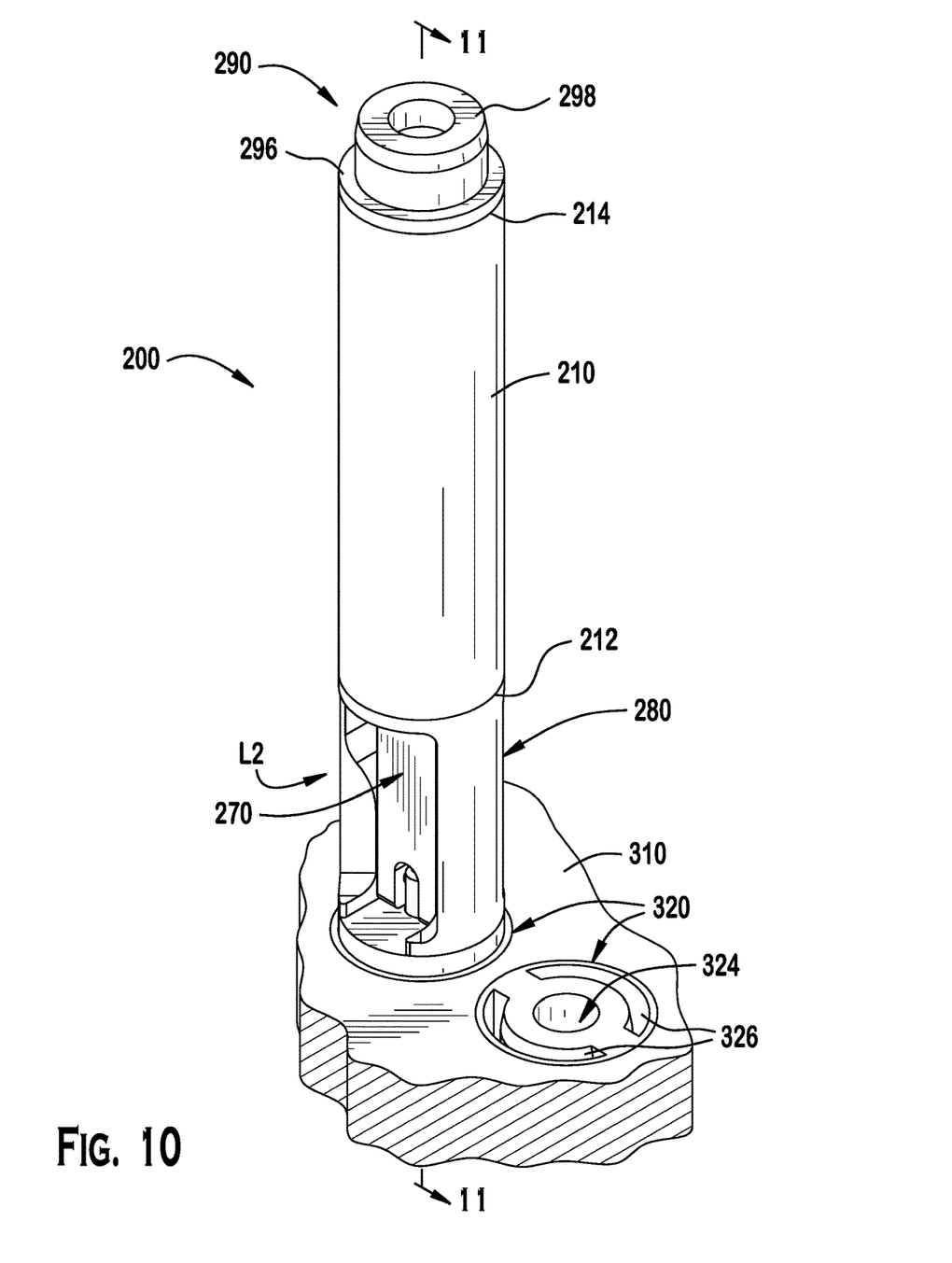
FIG. 10 is a perspective view of the second latch section and the base with the latch of the second latch section in a locked position.

Moving the latch pin 260 closer to the second latch base 284 between the unlocked position L1 and the locked position L2 of the lever 270 compresses the elastic expanding element 254. The expanding element 254 expands under the compressive force as shown in FIG. 11 and forms an interference fit with the expanding element receiving passageway 324. In the locked position L2, the second latch section 280 of the support connector 200 is secured to the base 300 by the expanded expanding element 254. Attachment of the second latch section 280 to the base 300 with the lever 270 in the locked position L2 is shown in FIG. 10.

To release the attachment of the second latch section 280 to the base 300, the lever 270 is moved from the locked position L2 back to the unlocked position L1. The expanding element 254 elastically returns to the un-compressed position and is no longer interference-fit with the latch expanding element receiving passageway 324, as shown in FIG. 9. The second latch section 280 can then be removed from the base 300. The second latch section 280 permits the support connector 200 to be securely attached to the base 300 in a releasable manner.

Releasable attachment of the support connectors 200 to other support connectors 200 via the second latch section 280 and the third latch section 290 will now be described in greater detail with reference to FIGS. 7 and 11-13. A support connector 200 having the second latch section 280 on an end is removably attachable to the third latch section 290 of another support connector 200. This connection is similar to the connection between the second latch section 280 and the base key 320 described above.

Figure 12:
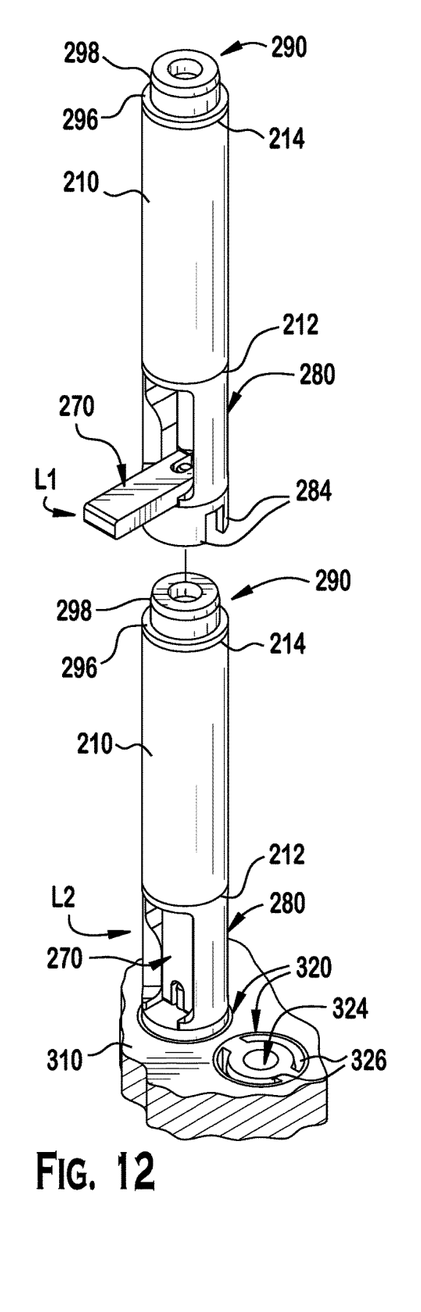
FIG. 12 is a perspective view of the second latch section and the third latch section with the latch of the second latch section in the unlocked position.

With the lever 270 in the unlocked position L1, as shown in FIG. 12, the latch pin 260 surrounded by the expanding element 254 is inserted through the third support member 298 and into an interior of the third latch section 290 while the second support members 286 are inserted around the third support member 298. The second latch base 284 and the latch pin 260 have a shape complementary to that of the third support member 298. The second latch section 280 is inserted into the third support member 298 until the disc-shaped portion 285 abuts a top surface of the third support member 298, the flange 262, the expanding element 254, and the static washer 252 are disposed within the third latch section 290, and the second support members 286 surround the third support member 298, as shown in FIG. 13.

Figure 13:
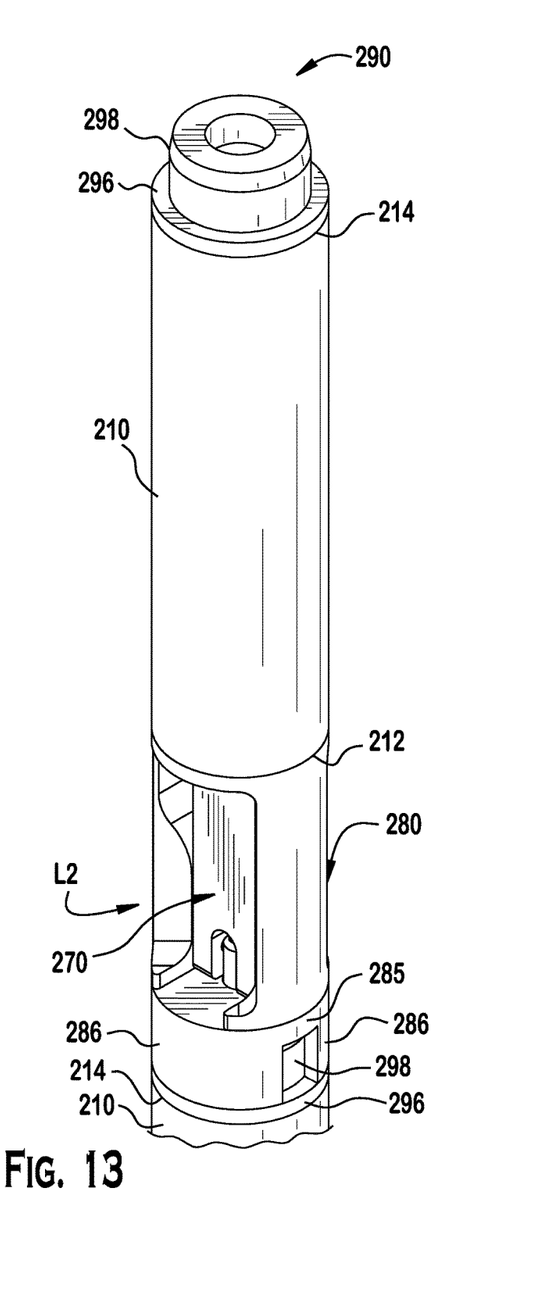
FIG. 13 is a perspective view of the second latch section and the third latch section with the latch of the second latch section in the locked position.

As similarly described for releasable latching of the other latches of the support connector 200, to secure the second latch section 280 to the third latch section 290, the lever 270 is rotated from the unlocked position L1 to the locked position L2 shown in FIG. 13 with the latch pin 260 and expanding element 254 remaining in the fully inserted position. During motion of the lever 270 from the unlocked position L1 to the locked position L2, the lever body 272 pivots while bearing against a surface of the second latch base 284. The motion of the lever body 272 moves the latch pin 260 in the direction A towards the second latch base 284, and in the locked position L2 as shown in FIG. 11, the flange 262 of the latch pin 260 is securely held closer to the second latch base 284 than in the unlocked position L1.

Moving the latch pin 260 closer to the second latch base 284 between the unlocked position L1 and the locked position L2 of the lever 270 compresses the elastic expanding element 254. The expanding element 254 expands under the compressive force and forms an interference fit with the third support member 298. In the locked position L2, the second latch section 280 of the support connector 200 is secured to the third latch section 290 of another support connector 200 by the expanded expanding element 254. Attachment of the second latch section 280 to the third latch section 209 with the lever 270 in the locked position L2 is shown in FIG. 13.

To release the attachment of the second latch section 280 to the third latch section 290, the lever 270 is moved from the locked position L2 back to the unlocked position L1. The expanding element 254 elastically returns to the un-compressed position and is no longer interference-fit with the third support member 298. The second latch section 280 can then be removed from the third latch section 290. The second latch section 280 permits the support connector 200 to be securely attached to the third latch section 290 of another support connector 200 in a releasable manner.

The releasable attachments of the node connectors 100, the support connectors 200, and the bases 300 described above permit simple and modular construction of the display support system 1. A plurality of display panels (not shown) may be attached to outer facing planar surfaces 110 of the node connectors 100 supported by the display support system 1 via the latch receiving passageways 120.

As shown in FIG. 1, in one arrangement of the display support system 1, a base 300 is disposed on each end of the display support system 1. The support connector 200 connected to each base 300 has the second latch section 280 disposed on a first end and releasably connected to the base 300 and the first latch section 230 disposed on an opposite second end and releasably connected to the node connector 100. Between the support connectors 200 connected directly to the bases 300, the node connectors 100 are connected to support connectors 200 having first latch sections 230 on each end to form a desired support structure.

Another arrangement of a display support system 1 is shown in FIG. 14. In FIG. 14, one base 300 supports the display support system 1. A first support connector 200 has the second latch section 280 disposed on a first end and releasably connected to the base 300 and a third latch section 290 disposed on an opposite second end and releasably connected to the second latch section 280 of a second support connector 200. The second support connector 200 has a first latch section 230 disposed on an opposite end and releasably connected to the node connector 100. Aside from the support connectors 200 connected directly to the base 300, the node connectors 100 are connected to support connectors 200 having first latch sections 230 on each end to form a desired support structure.

What is claimed is:
1. A support connector, comprising:
a support body having a latch section receiving passageway extending from the first end to an opposite second end and positioned along an interior thereof; and a latch extending from a first end of the support body and having:
   a latch body having a body base and a lever receiving space extending through a center thereof;
   a lever secured in the lever receiving space and rotatably connected to the latch body;
   a latch pin extending through the body base and connected to the lever; and
   an expanding element positioned between an end of the latch pin and the body base, the expanding element receiving the latch pin.

2. The support connector of claim 1, wherein the latch body is a monolithic structure having a protrusion disposed on a first end and a latch surface disposed on an opposite second end thereof.

3. The support connector of claim 2, wherein the latch body is cylindrical.

4. The support connector of claim 2, wherein the protrusion extends into and secures to the support body.

5. The support connector of claim 1, wherein the latch pin is an elongated cylindrical shaft having a flange disposed on a first end and a hinge rod receiving passageway extending through an opposite second end of the shaft.

6. The support connector of claim 5, wherein the lever includes a lever body and a hinge rod.

7. The support connector of claim 6, wherein the lever body is an elongated rectangular member having a plurality of hinge rod receiving passageways extending through an end of the lever body.

8. The support connector of claim 7, wherein the lever body defines a latch pin receiving space at an end between the hinge rod receiving passageways.

9. The support connector of claim 8, wherein the hinge rod is an elongated cylindrical member and is disposed in the hinge rod receiving passageways, extending through the latch pin receiving space.

10. A support connector, comprising:
a support body having a latch receiving passageway extending from a first end thereof and into interior of the support body; and
a latch extending into the latch receiving passageway and secured to the support body, the latch having:
   a latch body having a body base and a lever receiving space extending through a center thereof;
   a lever secured in the lever receiving space at one end to the latch body and rotatable at a second end away from the lever receiving space;
   a latch pin extending through the body base and connected to the lever; and
   an expanding element positioned between an end of the latch pin and the body base, the expanding element receiving the latch pin, disposed around the latch pin, and formed of an elastically deformable material,
wherein the lever is pivotably secured to the latch pin and rotatable between an unlocked position and a locked position, and wherein an outward surface of the expanding element pushes outward when the latch pin compresses the expanding element against the body base.

11. The support connector of claim 10, wherein the lever is fully received within the lever receiving space when in the locked position.

12. The support connector of claim 11, wherein the lever bears against the body base during motion between the unlocked position and the locked position.

13. The support connector of claim 11, wherein the lever urges the latch pin through the body base.

14. The support connector of claim 13, wherein the body base includes a disc-shaped portion with a plurality of support members therefrom.

15. The support connector of claim 14, wherein the support members are keyed to correspond with a support member receiving device.

* * * * *